United States Patent
Ji et al.

(10) Patent No.: US 11,575,249 B2
(45) Date of Patent: Feb. 7, 2023

(54) CABLE LAYING DEVICE

(71) Applicant: YANTAI JEREH PETROLEUM EQUIPMENT & TECHNOLOGIES CO., LTD., Yantai Shandong (CN)

(72) Inventors: Xiaolei Ji, Yantai Shandong (CN); Shouzhe Li, Yantai Shandong (CN); Liang Lv, Yantai Shandong (CN); Chunqiang Lan, Yantai Shandong (CN); Sheng Chang, Yantai Shandong (CN); Shuzhen Cui, Yantai Shandong (CN); Yipeng Wu, Yantai Shandong (CN); Xincheng Li, Yantai Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 105 days.

(21) Appl. No.: 17/185,170

(22) Filed: Feb. 25, 2021

(65) Prior Publication Data

US 2022/0224087 A1 Jul. 14, 2022

(30) Foreign Application Priority Data

Jan. 13, 2021 (CN) .......................... 202110042389.6
Jan. 13, 2021 (CN) .......................... 202120094159.X

(51) Int. Cl.
*H02G 1/06* (2006.01)
*F16L 1/032* (2006.01)
*E21B 41/00* (2006.01)

(52) U.S. Cl.
CPC ............... *H02G 1/06* (2013.01); *E21B 41/00* (2013.01); *F16L 1/032* (2013.01)

(58) Field of Classification Search
CPC ... F16L 1/00; F16L 1/032; H02G 1/00; H02G 1/06; E21B 41/00

(Continued)

(56) References Cited

U.S. PATENT DOCUMENTS 6,405,114 B1 * 6/2002 Priestley ............... B66F 11/046
  701/50
8,684,333 B2 * 4/2014 Devine ................... H02G 1/04
  182/2.1

(Continued)

FOREIGN PATENT DOCUMENTS

| CN | 205141537 U | 4/2016 |
| CN | 209488063 U | 10/2019 |
| CN | 112701625 A | 4/2021 |

OTHER PUBLICATIONS

International Search Report dated Oct. 20, 2021, for International Application No. PCT/CN2021/090032, 4 pages.

*Primary Examiner* — Lee D Wilson
*Assistant Examiner* — Sidney D Hohl
(74) *Attorney, Agent, or Firm* — Crowell & Moring LLP

(57) ABSTRACT

The present application relates to a cable laying device (100). The cable laying device is used for laying a cable, and comprises:
a cable laying part (10) comprising a base section (11) and an extension section (12); a turnover mechanism (20) and a positioning adjustment mechanism (30), wherein,
the base section (11) and the extension section (12) are connected rotatably relative to each other at their longitudinal ends;
the positioning adjustment mechanism (30) is connected to the base section and comprises a rotating assembly (31), wherein the rotating assembly (31) drives the cable laying part to rotate; and
the turnover mechanism (20) connects the extension section (12) and the base section (11), and drives the extension section (12) to turn over relative to the base section (11).

13 Claims, 3 Drawing Sheets

(58) Field of Classification Search
USPC .................. 254/134.3, 134.43 FT, 134.3 R
See application file for complete search history.

(56) References Cited

U.S. PATENT DOCUMENTS

2002/0100898 A1* 8/2002 Knoerzer ................. H02G 1/08
                                                     254/134.3 R
2002/0178518 A1   12/2002 Eberl et al.

* cited by examiner

CABLE LAYING DEVICE

FIELD

The present application relates to a power supply cable laying techniques in the application of large electrical equipment, specifically to a cable laying device.

BACKGROUND

In oil field drilling, when the electrical equipment needs to be powered, it is often necessary to manually drag the power supply cables towards the electrical equipment. During wellsite operation, many types of electrical equipment should be simultaneously operated. Under these circumstances, a lot of time should be spent on preparing and providing the power supply cables to the electrical equipment. When the operation is finished, the power supply cables also need to be collected. This process would incur much time and labor cost. Meanwhile, frequent drag of the power supply cables on the ground surface would cause certain wear to the power supply cables.

SUMMARY

An object of the present application is to provide a cable laying device, to solve or at least alleviate problems existing in the prior art.

According to the first aspect of the present application, there is provided a cable laying device for laying cables, characterized in that the device comprises:
a cable laying part comprising a base section and an extension section; a turnover mechanism and a positioning adjustment mechanism, wherein,
the base section and the extension section are connected rotatably relative to each other at their longitudinal ends;
the positioning adjustment mechanism is connected to the base section and comprises a rotating assembly, wherein the rotating assembly drives the cable laying part to rotate; and the turnover mechanism connects the extension section and the base section, and drives the extension section to turn over relative to the base section.

Optionally, in some embodiments of the present application, the positioning adjustment mechanism further comprises a lifting unit that drives the cable laying part to perform lifting movement, wherein the rotating assembly is arranged at the lifting unit carrying out lifting movement together with the lifting unit.

Optionally, in some embodiments of the present application, the rotating assembly is configured to comprise a gear transmission assembly, wherein an output portion of the gear transmission assembly is connected with the base section and drives the base section to rotate.

Optionally, in some embodiments of the present application, the turnover mechanism comprises a turnover driving part and a bar transmission assembly driven by the turnover driving part, the bar transmission assembly comprising a first bar element and a second bar element, wherein,
the first bar element and the second bar element are respectively connected with the base section and the extension section, the first bar element and the second bar element are pivotally connected with each other, and the extension section and the base section are also pivotally connected with each other, so that the first bar element, the second bar element, the base section as well as the extension section form a four-bar linkage mechanism.

Optionally, in some embodiments of the present application, the turnover driving part is connected with the pivot shaft between the first bar element and the second bar element to drive the pivot shaft for performing linear reciprocating movement.

Optionally, in some embodiments of the present application, the turnover driving part is connected with the first bar element, which is connected to the base section, to drive the first bar element for performing rotating movement.

Optionally, in some embodiments of the present application, the turnover driving part is configured to comprise a turnover driving hydraulic cylinder, wherein the piston of the turnover driving hydraulic cylinder drives the bar transmission assembly.

Optionally, in some embodiments of the present application, wherein the turnover mechanisms are respectively arranged in pairs at both longitudinal ends along the pivot shaft between the base section and the extension section.

Optionally, in some embodiments of the present application, wherein the cable laying device further comprises a height-holding mechanism for supporting and holding the height of the cable laying part, the height-holding mechanism being connected to the positioning adjustment mechanism at one end and connected to the base section at the other end.

Optionally, in some embodiments of the present application, wherein the positioning adjustment mechanism is arranged at one longitudinal end of the base section.

Optionally, in some embodiments of the present application, wherein the height-holding mechanism comprises a hydraulic cylinder, wherein the hydraulic cylinder is connected at one end to the base section and configured to support the base section through telescopic movement.

Optionally, in some embodiments of the present application, the cable laying device further comprises a carrying mechanism comprising a semi-trailer, a vehicle-mounted structure or a skid-mounted structure, wherein the positioning adjustment mechanism is fixed on the chassis of the semi-trailer, the vehicle-mounted structure or the skid-mounted structure.

Optionally, in some embodiments of the present application, the cable laying device further comprises a lifting leg assembly for stabilizing the carrying mechanism, which comprises at least one lifting leg for supporting and stabilizing the carrying mechanism through lifting motion or telescopic movement, wherein the lifting leg is connected at each of the lateral sides of the chassis of the semi-trailer, the vehicle-mounted structure or the skid-mounted structure, and configured to be rotatable relative to the chassis.

Optionally, in some embodiments of the present application, the extension section includes an extension section disposed at a longitudinally extending surface of the base section relative to longitudinal ends of the base section and/or an extension section disposed at a lateral side surface of the base section relative to longitudinal ends of the base section.

BRIEF DESCRIPTION OF THE DRAWINGS

Reference may be made to preferred embodiments shown in the figures to enable better understanding of the above and other objects, features, advantages and functions of the present application. The same reference numerals in the figures denote the same parts. Those skilled in the art should appreciate that the figures are intended to schematically illustrate the preferred embodiments of the present application, and not intended to impose any limitations to the scope of the present application. Wherein, FIG. 1 exemplarily shows the cable laying device in use according to the present application.

LISTING OF REFERENCE NUMBERS

Figure 1:
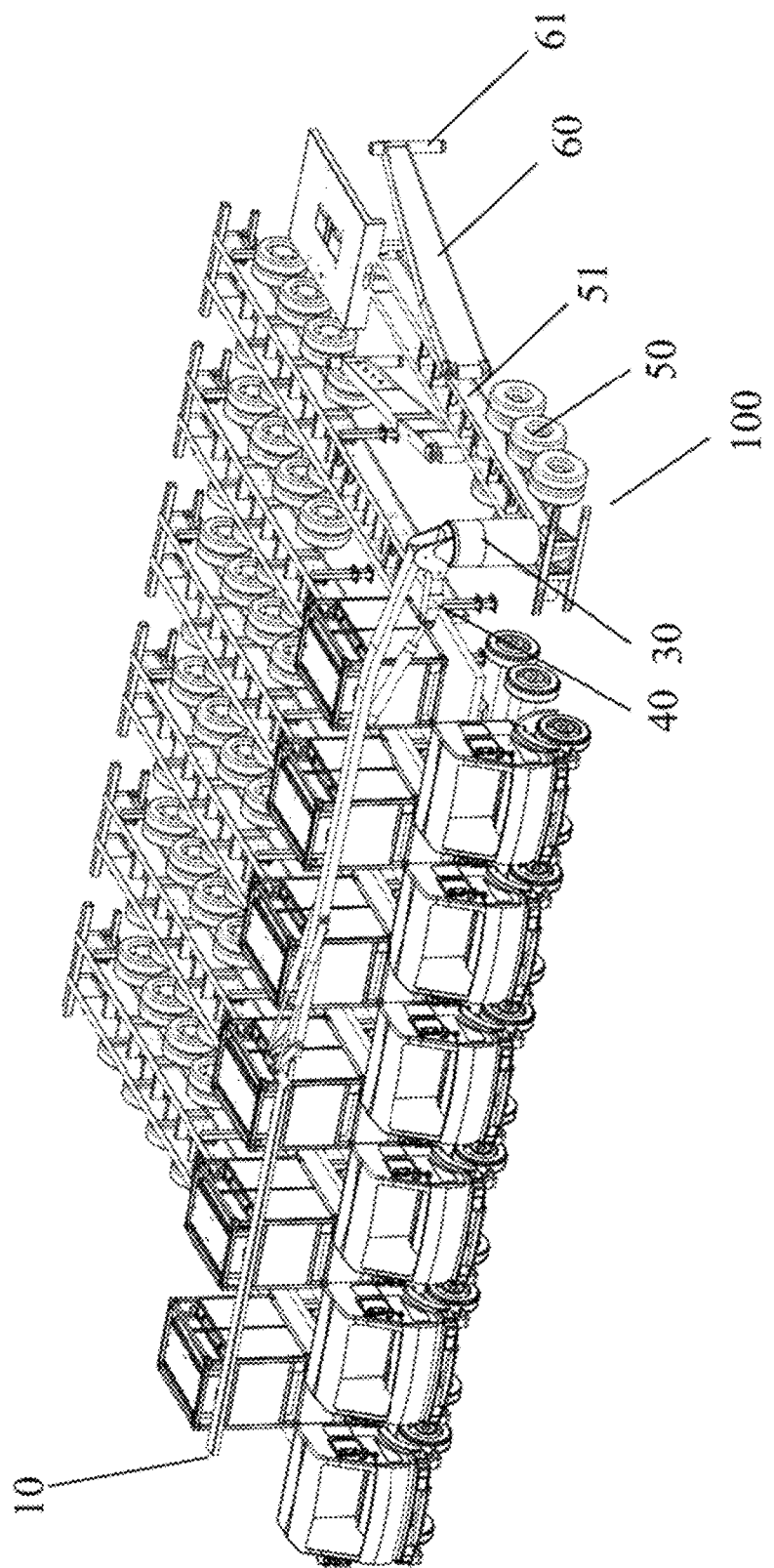

100 Cable laying device
10 Cable laying part
11 Base section
12 Extension section
13 Pivot shaft
20 Turnover mechanism
21 Turnover driving part
22 Bar transmission assembly
211 Piston of turnover driving hydraulic cylinder
221 First bar element
222 Second bar element
30 Positioning adjustment mechanism
31 Rotating component
32 Lifting unit
40 Height-holding mechanism
41 Height-holding hydraulic cylinder
50 Carrying mechanism
51 Chassis
60 Lifting leg assembly
61 Lifting leg

DETAILED DESCRIPTION OF EMBODIMENTS

Specific embodiments of the present application will now be described in detail with reference to the figures. The embodiments described herein are only preferred embodiments according to the present application. Those skilled in the art can envision other modes capable of implementing the present application on the basis of the preferred embodiments, and said other modes also fall within the scope of the present application.

The cable laying device 100 as disclosed in the present application can reach the technical effects of applying mechanical devices to transport and lay cables as shown in FIG. 1, thereby reducing labor cost during oil field operations as well as avoiding severe cable damage during manual cable hauling. Besides, the cable laying device 100 disclosed in the present application can be adapted to different laying conditions defined by different electrical equipment, thereby improving the efficiency during cable laying. Specifically, as shown in FIG. 1, the cable laying device can lay the cables, in the way of mechanical driving, to a certain height, at a certain angle as well as in a certain length to a position which is most convenient for electrical equipment.

Figure 2:
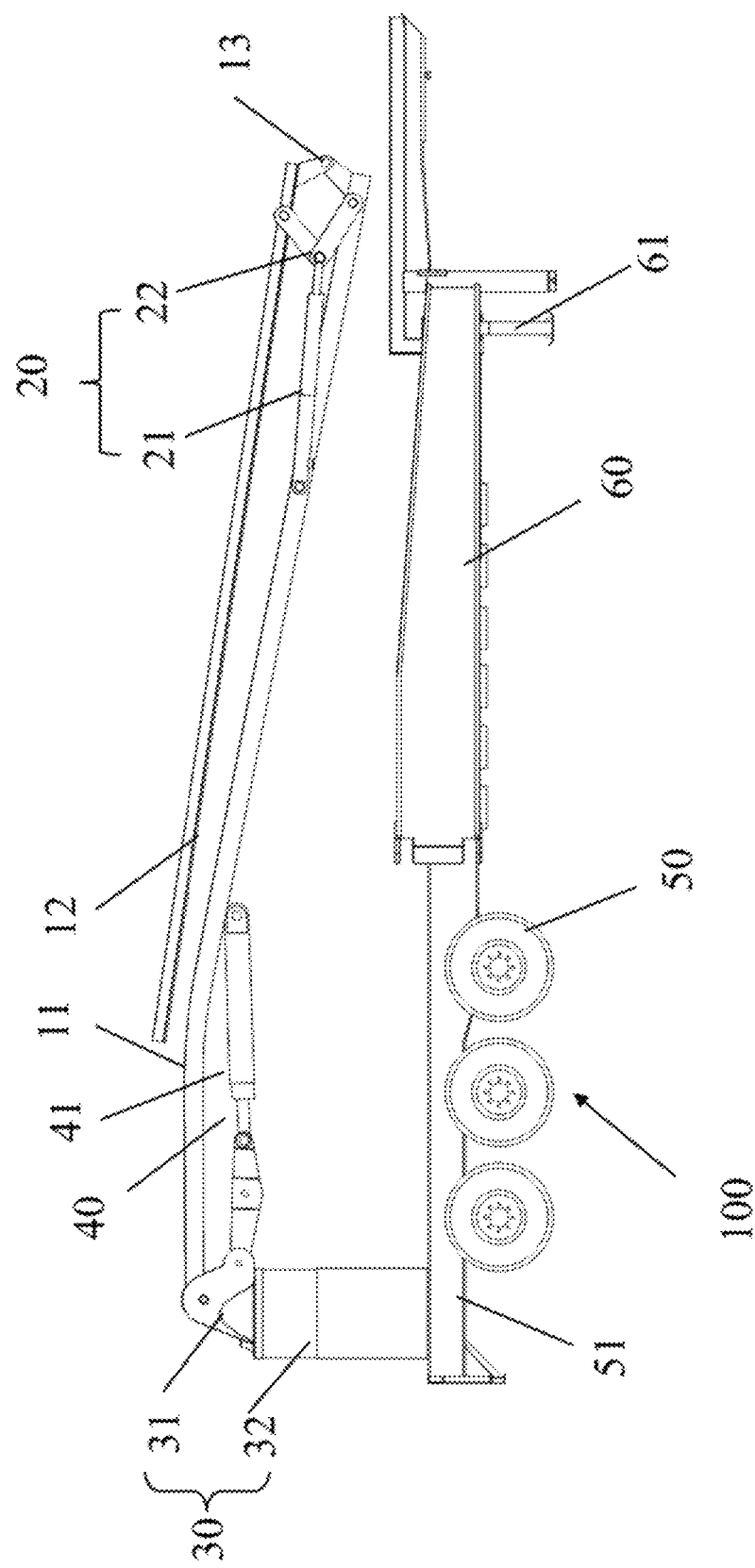
FIG. 2 exemplarily shows a longitudinal front view of the cable laying device according to the present application.

Referring to FIG. 1 and FIG. 2, it can be seen that the cable laying device 100 comprises: a cable laying part having a base section 11 and a length adjustable extension section 12; a turnover mechanism 20 and a positioning adjustment mechanism 30. Specifically, the base section 11 and the extension section 12 are such connected with each other at their longitudinal ends that they are moveable relative to each other, and can accommodate, transport and lay cables. Specifically, depending on the application, the extension section can be provided at one or both longitudinal ends of the base section. In this case, the extension section 12 can be extended from the base section 11 according to the working environment of the electrical equipment. In order to further achieve the flexibility in use, the cable laying device 100 further comprises a positioning adjustment mechanism 30 including a rotating assembly 31 which can be connected to the base section 11, i.e. at a position such as one longitudinal end or a certain longitudinal position of the base section 11, so that the base section 11 or the cable laying part can rotate driven by the rotating assembly, thus the cable laying device can be applied at different installation positions of electrical equipment. The cable laying device 100 comprises a turnover mechanism 20, wherein the turnover mechanism 20 connects the base section 11 with the extension section 12, so that the extension section 12 can be driven to turn over in different angles from the base section 11 depending on the requirements, thereby realizing different heights and lengths of the whole cable laying part and hence different cable laying solutions.

It needs to be explained here that in the present application, the "longitudinal position" of the base section 11 refers to the position along the length direction of the base section 11 or the extension section 12.

Optionally, in order to enable the cable laying device 100 to be better applicable to electrical equipment of different heights, the positioning adjustment mechanism 30 may also have a lifting unit 32 for adjusting the height of the cable laying part. Here, in order to avoid the interference with the rotating movement of the cable laying part, the rotating assembly 31 can be arranged at the lifting unit 32 and the lifting unit 32 is connected to the cable laying part or the base section 11 via the rotating assembly 31. The rotating assembly 31 can drive the base section or the cable laying part to rotate around the lifting unit 32.

To be specific, optionally, the rotating assembly 31 may be configured as a gear transmission assembly known in the prior art, wherein the gear transmission assembly may be driven by an external motor or other driving mechanism, and its output part may be configured to connect with and drive the base section 11 into rotating.

Figure 3:
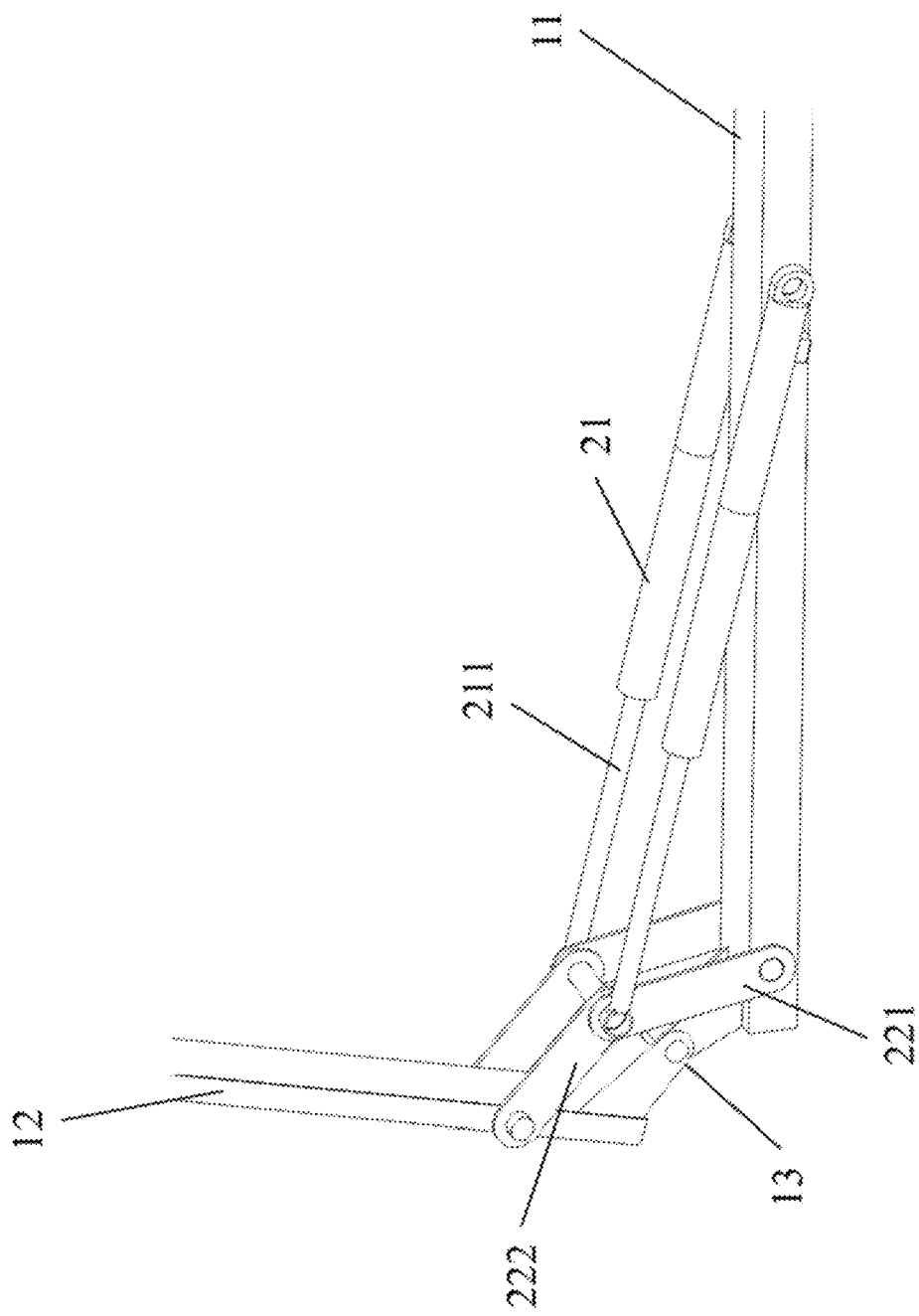
FIG. 3 exemplarily shows structural details of the turnover mechanism.

Optionally, as shown in FIG. 3, the turnover mechanism 20 that drives the extension section 12 to perform turnover movement may comprise a turnover driving part 21 and a bar transmission assembly 22 driven by the turnover driving part 21. Specifically, the bar transmission assembly 22 includes a first bar element 221 and a second bar element 222, wherein one end of the first bar element 221 is connected to the base section 11, and the other end is pivotally connected to the second bar element 222, meanwhile, the other end of the second bar element 222 is connected to the extension section 12, and the base section and the extension section are connected with each other via a pivot shaft 13, so that the first bar element 221, the second bar element 222, the base section 11 and the extension section 12 can form a four-bar linkage mechanism. In this case, the turnover driving part 21 connects and drives the pivot shaft between the first bar element 221 and the second bar element 222 to perform linear reciprocating movement, so that the second bar element 222 drives the extension section 12 to perform turnover movement.

Alternatively, the turnover driving part 21 may also be connected to and drive the first bar element 221 which is connected with the base section 11 to reciprocatingly rotate, so as to enable the second bar element 222 to drive the extension section 12 for performing turnover movement.

Within the scope of the present application, optionally, the turnover driving part 21 may be configured to comprise a turnover driving hydraulic cylinder, wherein the piston 211 of which may be connected with the bar transmission assembly i.e. the pivot shaft between the first bar element 221 and the second bar element 222 or the first bar element 221, so as to drive the bar transmission assembly 22.

Within the scope of the present application, optionally, in order to achieve a more stable and balanced turnover movement, the turnover mechanism 20 may be arranged along the longitudinal direction of the pivot shaft 13 between the base section 11 and the extension section 12, for example, may be arranged in pairs at longitudinal ends of the pivot shaft 13.

Since that, during operation of the cable laying device 100, the cable laying part is often held in a certain height in the form of an elongated load-bearing part, in order to stabilize the height of the elongated cable laying part, the cable laying device 100 disclosed in the present application may optionally further include a height-holding mechanism 40, which may be arranged together with the lifting unit 32 of the positioning adjustment mechanism 30 and maintain the desired height of the cable laying part. Specifically, the height-holding mechanism 40 may be configured to connect to the positioning adjustment mechanism 30 at one end while connect to the base section 11 at the other end, specifically connect at a longitudinal position other than the installation position of the positioning adjustment mechanism 30 or the rotating assembly 31 of the base section 11, and hold the height of the cable laying part. That is, the height-holding mechanism 40 may be arranged along the longitudinal tilted direction relative to the cable laying part.

In this case, optionally, the positioning adjustment mechanism 30 may be provided at one longitudinal end of the cable laying part or the base section 11, while the height-holding mechanism 40 can support the cable laying part at another longitudinal position of the base section 11, thereby improving the stability of the cable laying part. For example, it can be considered that the height-holding mechanism 40 may comprise a hydraulic cylinder, wherein a piston is connected with the base section 11 and supports the cable laying part through telescopic movement.

In order to more conveniently transport the cable laying device 100, the cable laying device 100 can also comprise a carrying mechanism 50. It can be considered that the carrying mechanism 50 includes a semi-trailer, a vehicle-mounted structure or a skid-mounted structure, on the chassis 51 of which the positioning adjustment mechanism 30 can be fixedly arranged.

In the case where there exists a carrying mechanism 50 or a semi-trailer, a vehicle-mounted structure or a skid-mounted structure, when the cable laying part is rotated 90 degrees or more relative to the carrying mechanism 50, it is possible that the center of gravity of the entire cable laying device 100 deviates from the carrying mechanism 50 and moves toward the cable laying part. Therefore, in order to maintain the stability of the carrying mechanism 50 in the above operating conditions, the cable laying device 100 may optionally include a lifting leg assembly 60, which comprises at least one lifting leg 61 that supports and stabilizes the carrying mechanism 50 via lifting motion or telescopic movement. The lifting legs may be connected at both lateral sides of the chassis 51 of the semi-trailer, vehicle-mounted structure or skid-mounted structure (as shown in FIG. 1 or 2). Depending on the degree the cable laying part have rotated relative to the chassis 51, the lifting leg is configured to be able to rotate into different angles relative to the chassis 51, thereby achieving optimal supporting for the carrying mechanism 50.

Furthermore, within the scope of the present application, the connection direction between the extension section 12 and the base section 11 is not limited. That is, at the longitudinal ends of the extension section 12 and the base section 11, the extension section 12 may include an extension section connected to the longitudinal extension surface of the base section 11 or an extension section connected to the lateral side surface of the base section 11. In other words, when the extension section 12 is connected at the longitudinal extension surface of the base section 11, the extension section 12 can lie on the longitudinal extension surface of the base section 11 when it is not "extended" or "turned over", while when the extension section 12 is connected at both lateral sides of the base section 11, the extension section 12 can abut against the lateral sides of the base section 11 when it is not "extended" or "turned over".

The cable laying device disclosed by the present application can conveniently and efficiently realize electricity supply to a plurality of electrical equipment. As shown in FIG. 1, depending on the location of the electrical equipment and site restrictions, the cable laying device can enable the cable laying part or the base section as well as the extension section to rotate by a certain angle (e.g., 90 degrees in FIG. 1) by means of the rotating assembly, and adjust the height of the cable laying part by using the lifting unit, so that the rotating position and height of the cable laying part can be more suitable for connecting the electrical equipment. In addition, according to the number of electrical equipment and the height of their connectors, the extension section of the cable laying part can correspondingly turn over a certain angle relative to the base section to form a certain inclination, so as to supply the electrical equipment with electricity. Therefore, the cable laying device disclosed by the present application can not only reach a high cable laying efficiency, but also reduce the abrasion of the cables through the cable carrying and protecting effects accomplished by the cable laying part.

The above depictions of various embodiments of the present application are provided to those having ordinary skill in the art for depiction purpose, and are not intended to exclude other embodiments from the present application or limit the present application to a single disclosed embodiment. As described above, various alternatives and modifications of the present application will be apparent to those of ordinary skill in the art. Accordingly, although some alternative embodiments have been described in detail, those having ordinary skill in the art will understand or readily develop other embodiments. The application is intended to cover all alternatives, modifications and variations of the present application described herein, as well as other embodiments falling within the spirit and scope of the present application described herein.

We claim:

1. A cable laying device (100) for laying cables, comprising:
   a cable laying part (10) comprising a base section (11) and an extension section (12), a turnover mechanism (20), and a positioning adjustment mechanism (30), wherein:
   a longitudinal end of the base section (11) and a longitudinal end of the extension section (12) are connected rotatably relative to each other;
   the positioning adjustment mechanism (30) is connected to the base section and comprises a rotating assembly (31), wherein the rotating assembly (31) drives the cable laying part to rotate;
   the turnover mechanism (20) connects the extension section (12) and the base section (11), and drives the extension section (12) to turn over relative to the base section (11);

the turnover mechanism (20) comprises a turnover driving part (21) and a bar transmission assembly (22) driven by the turnover driving part (21), the bar transmission assembly (22) comprising a first bar element (221) and a second bar element (222);

the first bar element (221) and the second bar element (222) are respectively connected with the base section (11) and the extension section (12);

the first bar element (221) and the second bar element (222) are pivotally connected with each other; and the extension section (12) and the base section (11) are pivotally connected with each other, so that the first bar element (221), the second bar element (222), the base section (11) as well as the extension section (12) form a four-bar linkage mechanism.

2. The cable laying device (100) according to claim 1, wherein the positioning adjustment mechanism (30) further comprises a lifting unit (32) that drives the cable laying part to perform lifting movement, and wherein the rotating assembly (31) is arranged at the lifting unit (32) to carry out lifting movement together with the lifting unit (32).

3. The cable laying device (100) according to claim 1, wherein the rotating assembly (31) comprises a gear transmission assembly, and wherein an output portion of the gear transmission assembly is connected with the base section (11) and drives the base section (11) to rotate.

4. The cable laying device (100) according to claim 1, wherein the turnover driving part (21) is connected with a pivot shaft between the first bar element (221) and the second bar element (222) to drive the pivot shaft for performing linear reciprocating movement.

5. The cable laying device (100) according to claim 1, wherein the turnover driving part (21) is connected with the first bar element (221), which is connected to the base section (11), to drive the first bar element for performing rotating movement.

6. The cable laying device (100) according to claim 1, wherein the turnover driving part (21) comprises a turnover driving hydraulic cylinder, and wherein a piston (211) of the turnover driving hydraulic cylinder drives the bar transmission assembly (22).

7. The cable laying device (100) according to claim 1, wherein the turnover mechanism is arranged in pairs at both longitudinal ends along a pivot shaft (13) between the base section and the extension section.

8. The cable laying device (100) according to claim 2, further comprising a height-holding mechanism (40) for supporting and holding a height of the cable laying part (10), the height-holding mechanism (40) being connected to the positioning adjustment mechanism (30) at one end and being connected to the base section (11) at another end.

9. The cable laying device (100) according to claim 1, wherein the positioning adjustment mechanism (30) is arranged at one longitudinal end of the base section (11).

10. The cable laying device (100) according to claim 8, wherein the height-holding mechanism (40) comprises a hydraulic cylinder (41), and wherein the hydraulic cylinder (41) is connected at one end to the base section (11) and configured to support the base section (11) through telescopic movement.

11. The cable laying device (100) according to claim 1, further comprising a carrying mechanism (50); the carrying mechanism comprising a semi-trailer and a vehicle-mounted structure or a skid-mounted structure, wherein the positioning adjustment mechanism (30) is fixed on a chassis (51) of the semi-trailer, the vehicle-mounted structure or the skid-mounted structure.

12. The cable laying device (100) according to claim 11, further comprising a lifting leg assembly (60) for stabilizing the carrying mechanism (50), which comprises at least one lifting leg (61) for supporting and stabilizing the carrying mechanism (50) through lifting motion or telescopic movement, wherein the at least one lifting leg is each connected at one of lateral sides of the chassis (51) of the semi-trailer, the vehicle-mounted structure or the skid-mounted structure, and configured to be rotatable relative to the chassis (51).

13. The cable laying device (100) according to claim 1, wherein the extension section (12) includes an extension section disposed at a longitudinally extending surface of the base section relative to longitudinal ends of the base section (11) or an extension section disposed at a lateral side surface of the base section (11) relative to the longitudinal ends of the base section (11).

* * * * *